US006688956B1

(12) United States Patent
Yokley et al.

(10) Patent No.: US 6,688,956 B1
(45) Date of Patent: Feb. 10, 2004

(54) SUBSTRATE POLISHING DEVICE AND METHOD

(75) Inventors: Edward M. Yokley, Pembroke Pines, FL (US); Yaw S. Obeng, Orlando, FL (US)

(73) Assignee: PsiloQuest Inc., Orlando, FL (US)

( * ) Notice: Subject to any disclaimer, the term of this patent is extended or adjusted under 35 U.S.C. 154(b) by 0 days.

(21) Appl. No.: 09/934,780

(22) Filed: Aug. 22, 2001

Related U.S. Application Data

(60) Provisional application No. 60/250,299, filed on Nov. 29, 2000.

(51) Int. Cl.[7] ............................................... B24D 11/00
(52) U.S. Cl. ....................................... 451/526; 428/215
(58) Field of Search .............................. 451/526, 527, 451/528, 530, 537; 428/215, 412

(56) References Cited

U.S. PATENT DOCUMENTS

| 4,613,345 | A |   | 9/1986  | Thicke et al.              |
|-----------|---|---|---------|----------------------------|
| 5,242,742 | A | * | 9/1993  | Funk et al. ......... 428/215 |
| 5,605,760 | A | * | 2/1997  | Roberts ............. 428/409 |
| 6,017,265 | A |   | 1/2000  | Cook et al.                |
| 6,063,306 | A |   | 5/2000  | Kaufman et al.             |
| 6,106,754 | A |   | 8/2000  | Cook et al.                |
| 6,126,532 | A |   | 10/2000 | Sevilla et al.             |
| 6,132,298 | A |   | 10/2000 | Zuniga et al.              |
| 6,171,181 | B1 | * | 1/2001  | Roberts et al. ........ 451/527 |
| 6,187,422 | B1 | * | 2/2001  | Murschall et al. ...... 428/220 |
| 6,267,644 | B1 |   | 7/2001  | Molnar                     |
| 6,277,474 | B1 | * | 8/2001  | Murschall et al. ...... 428/195 |
| 6,283,829 | B1 |   | 9/2001  | Molnar                     |
| 6,291,349 | B1 |   | 9/2001  | Molnar                     |
| 6,293,851 | B1 |   | 9/2001  | Molnar                     |
| 6,346,202 | B1 |   | 2/2002  | Molnar                     |
| 6,354,915 | B1 |   | 3/2002  | James et al.               |
| 6,413,153 | B1 |   | 7/2002  | Molar                      |
| 6,428,388 | B2 |   | 8/2002  | Molnar                     |
| 6,435,948 | B1 |   | 8/2002  | Molnar                     |

FOREIGN PATENT DOCUMENTS

| JP | 01 064776  | 3/1989  |
| JP | 08 078369  | 3/1996  |
| JP | 9132661    | 5/1997  |
| JP | 11 245164  | 9/1999  |
| WO | WO 9962673 | 12/1999 |

* cited by examiner

Primary Examiner—Dung Van Nguyen

(57) ABSTRACT

To address the deficiencies of the prior art, the present invention provides a polishing pad comprising a thermoplastic polymer and a method of manufacturing therefor. More specifically, the present invention polishing pad fabricated from an extruded amorphous thermoplastic and free of a gate vestige. The invention also provides a method of manufacturing a polishing pad that is free from a gate vestige pad from an extruded amorphous thermoplastic.

8 Claims, No Drawings

SUBSTRATE POLISHING DEVICE AND METHOD

CROSS-REFERENCE TO PROVISIONAL APPLICATION

This application claims the benefit of U.S. Provisional Application No. 60/250,299 entitled "Substrate Polishing Device and Method," to Edward M. Yokley, filed on Nov. 29, 2000, which is commonly assigned with the present invention and incorporated herein by reference as if reproduced herein in its entirety.

TECHNICAL FIELD OF THE INVENTION

The present invention is directed, in general to polishing pads used for creating a smooth, ultra-flat surface on such items as glass, semiconductors, dielectric/metal composites, magnetic mass storage media and integrated circuits. More specifically, the present invention relates to polishing pads made of extruded thermoplastic polymer compositions.

BACKGROUND OF THE INVENTION

Chemical-mechanical polishing (CMP) is used increasingly as a planarizing technique in the manufacture of VLSI integrated circuits (ICs). It has potential for planarizing a variety of materials in IC processing but is used most widely for planarizing metallization layers and interlevel dielectrics on semiconductor wafers, and for planarizing substrates for shallow trench isolation.

The success of CMP over other methods of planarization derives from the ever-increasing needs for miniaturization in electronic devices, which requires tighter wafer planarity tolerances. Competing techniques, such as etchback, do not provide the required degree of wafer planarity that is achievable with the CMP technique. In CMP, a semiconductor wafer is polished using a repetitive, regular motion of a mechanical polishing wheel and a slurry, which may contain a mixture of fine particles and chemical etchants. By placing the slurry between the polishing wheel and the wafer, unwanted material may be successfully removed with a high degree of planarity. To aid in the planarization process, the polishing wheel commonly employs a specialized polishing pad that may be made from felted or woven natural fibers such as wool, urethane-impregnated felted polyester or various types of polyurethane plastic.

There are three critical consumable components in the CMP process. One is the abrasive liquid slurry. The abrasive liquid slurry's composition must be altered, and special formulations must be produced for each different substrate being polished. Some substrates require a high pH to be activated for polishing, and other substrates need a more acid environment. Still other substrates respond best to silica abrasives, while others require alumina or titanium abrasive particles. The second critical consumable component in the CMP process is the polishing pad. It must be very flat, uniform across its entire surface, and resistant to the chemical nature of the slurry and have the right combination of stiffness and compressibility to minimize effects like dishing and erosion. A third critical consumable component in the CMP process is the carrier film. The carrier film attaches the wafer to its rotating holder and must have an adequately flat and uniform in its thickness, must have an adhesive that will hold it tightly to the carrier but not too tightly to the wafer, all while being immune to the chemical environment in which it works.

Current polishing pads often prove inadequate due to increasing circuit integration density. During metal CMP, areas dense in features (i.e., alignment marks) tend to oxidize at a faster rate than areas with sparse distributions. This uncontrollable oxidation of the metals and the resultant aggressive mechanical loss are commonly referred to as erosion. Additionally, manufacturers have observed that oxide erosion in dense arrays increases dramatically as batch sizes are increased. It is also believed that current polishing pads contribute to "dishing" through deformation of the pad during polishing so that the center portion of larger circuit features are polished to a level lower than the exterior of the feature. Both effects contribute to lower surface planarity.

Another problem with current technology results from the process by which polishing pads are fabricated, rather than the properties inherent in the pad composition. One currently preferred method of pad fabrication is to pour a monomer of a thermosetting plastic, such as urethane, into a cylindrical mold. The monomer is then subjected to a thermal polymerization process. However, the polymerization occurs to varying degrees within the cylindrical mold, presumably due to heat transfer effects. The polymer material located near the center of the mold has different properties from that near the edges. Thus, a great variation in properties exists between pads cut from cross-sections near the top and bottom of the mold and those cut from the center. Likewise, the characteristics of an individual polishing pad made by this "sawed-log" technique may vary significantly from the outer regions of the pad to the center.

In another method, CMP pads are formed individually from a thermoplastic polymer by injection the thermoplastic material into a mold. While having the advantage of potentially reducing the variation in properties from pad to pad, this method causes undesirable intra-pad variations. Specifically, when the molten or uncured polymer is injected into the individual pad mold, a small amount of excess material is inevitably and undesirably formed on the surface of the polymer near the injection port. Such a phenomenon is known in the art as a "gate vestige" or "gating" of the pad. The undesirable effects of gating may be observed both locally, near the gate vestige itself, as well as throughout an individual pad.

Such manufacturing problems lead to less efficient polishing processes. Typically, these problems with conventional CMP polishing pads result in polishing processes may operate at only 60% uptime. Thus, it would be very beneficial if the process uptime could be increased.

Accordingly, what is needed in the art is an engineering design for a semiconductor wafer polishing pad that may be formed by a process that reduces intra- and inter-pad variation, while yielding polishing pads that are resistant to chemical degradation and provide a more uniform polishing by reducing erosion and dishing.

SUMMARY OF THE INVENTION

To address the deficiencies of the prior art, the present invention provides a polishing pad comprising an extruded thermoplastic polymer that is free of a gate vestige and a method of manufacturing therefor. In one embodiment, the present invention provides a extruded amorphous thermoplastic polishing pad that is free of a gate vestige.

In one exemplary embodiment, the present invention provides an extruded thermoplastic polishing pad wherein the thickness of the pad varies by less than 1%. In another embodiment, the pad has an elongation-to-break in the range of 25%–1000%. In certain embodiments the thermoplastic of the polish pad will have a critical surface tension greater than about 30 milliNewtons/meter.

In another aspect of the invention there is provided a method of manufacturing a polishing pad that includes extruding a thermoplastic material from an extrusion apparatus to produce an extruded thermoplastic material and forming a polishing pad that is free from a gate vestige and suitable for polishing a semiconductor wafer or integrated circuit from the extruded material. In certain embodiments, the method provides a polishing pad having a thickness that varies by less than 1%.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

DETAILED DESCRIPTION

The present invention is directed to polishing pads comprising an thermoplastic material. A wide variety of thermoplastic materials may be used to form polishing pads by the present invention. In certain embodiments, the thermoplastic material may be a polyurethane or a polyurea. Examples of commercially available thermoplastic polyurethanes include Texin™ 480A, Texin™ 455D, Texin™ 470D, and Texin™ 970D manufactured by Miles, Inc of Pittsburgh, Pa. Isoplast™ 302 (manufactured by Dow Chemical Co. of Midland, Mich.) is also a suitable commercially available polyurethane. Examples of commercially available polyethylene or polypropylene thermoplastics, such as Trovidor™ 500 or Versadur™ 500 (HPG International of Somerset, N.J.) are also suitable for the present invention. In other embodiments the thermoplastic may be a polycarbonate or may comprise an aliphatic or aromatic polyketone or an aromatic polysulfone. Useful polyketones include Carilon™ FX-100 and Carilon™ HM-700, manufactured by Shell Chemical Co. of Houston, Tex. Commercially available polysulfones include Udel™ 612, Udel™ P3500, Radel™ R4400, and Radel™ R5000 from BP Amoco Polymers, subsidiary of BP Amoco p.l.c. of London, England. In one particular embodiment the thermoplastic may be a nylon, particularly a 6,6 nylon or a 6, 12 nylon such as Zytel™ 101L and Zytel™ 1511-L, which are available from E. I. du Pont de Nemours and Company. Thermoplastic elastomers such as Santoprene™ 203-40 from Advanced Elastomer Systems of Akron, Ohio are also useful for the polishing pads of the present invention. In like manner, extruded and thermoformed sheets of Acrylonitrile-Butadiene Styrene (ABS), Polyvinylchoride, Polymethylmethacrylate, Polyvinylchloride foam, or Polyetherimide (Ultem) may be used to form polishing pads by the present invention.

Thermoplastic polymers suitable for the preparation of polishing pads according to the present invention will have other important characteristics. For instance, at least a portion of the thermoplastic polymer comprising the pad will have a critical surface tension of at least 30 milliNewtons/meter. In certain embodiments the critical surface tension range from about 35 milliNewtons/meter to about 50 milliNewtons/meter. Critical surface tension defines the wetability of a surface by noting the lowest surface tension a liquid can have and still exhibit a contact angle greater than zero degrees on that surface. Thus, thermoplastics with higher critical surface tensions are more readily wetable and therefore more hydrophilic. Critical surface tension values several of the thermplastics useful in the present invention are collected in Table I.

Table I

| Thermoplastic | Critical Surface Tension (mN/m) |
| --- | --- |
| polyurethane | ~45 |
| polyethylene | ~31 |
| polypropylene | ~34 |
| polycarbonate | ~45 |
| polysulfone | ~41 |
| 6, 6 nylon | ~42 |
| 6, 12 nylon | ~42 |

The thermoplastic polymer should be selected to have a modulus ranging from about 1 MPascal to about 200 MPascal and an elongation-to-break of about 25%–1000%. In certain embodiments, the thermoplastic may have elongation-to-break of about 50%–500%, while in others, the elongation-to-break may be about 100%–350%. Preferably, however, the polishing pad formed from the thermoplastic polymer will have an elongation-to-break of greater than 120%.

Of course, mixtures of two or more thermoplastics may also be used to make polishing pads of the present invention. If mixtures of polishing pads are used, care should be taken to ensure that the properties of the composite material be suitable. For instance, the component thermoplastics should be selected such that the critical surface tension of the composite thermoplastic is at least about 30 milliNewtons/m. The different thermoplastics may be blended and converted to powders according to conventional methods known in the art. Alternatively, different thermoplastic materials may be made into powders individually and combined as a blend of dissimilar powders. By blending different thermoplastics, the physical properties of the polishing pad or the extrusion processes may be fine tuned.

In one embodiment of the present invention, pellets of the desired thermoplastic may be heated by any conventional means to a temperature suitable for extrusion. Preferably, the thermoplastic is heated to a temperature greater than the its melting point. After heating, the thermoplastic can be forced through an extrusion die to form a continuous and substantially flat slab. Any conventional means may be used for the heating and extruding of the thermoplastic polymer. However, one skilled in the art will also recognize that measures should be taken to ensure uniformity and quality of the extruded thermoplastic. For instance, before extrusion, the thermoplastic may require special handling to minimize moisture content. In other circumstances, pellets of the thermoplastic may be milled to powder form to ensure good packing and uniform composition and flow through the extrusion apparatus. Thus, the extrusion apparatus should be capable of forming an extruded slab of thermoplastic that varies in thickness by 1% or less.

One skilled in the art will appreciate that the extrusion process allows the formation of a slab that is free of a gate vestige. Gate vestiges are an artifact of conventional pressure molding processes. Since it is a continuous flow process, products made by extrusion are free of gate vestiges. This aspect is particularly advantageous in the present invention since the presence of gate vestiges causes variation in the properties within different regions of the pad as well as causing regions of the pad to undesirably vary in thickness.

Once extruded, polishing pads may be cut as desired from the slab of extruded thermoplastic. Those familiar with thermoplastic extrusion will be familiar with techniques for cutting desired shapes from extruded thermoplastics. For instance, circular pads may be cut from the sheets using traditional thermoforming die cutters or laser cutters. While not necessary to the present invention, the cut pad may then be attached to a backing strip with adhesive or foam for shipping.

In certain embodiments, the process of the present invention may also include modifying a surface of the extruded material. Modification may be accomplished by any means known in the art that produces either ordered or random texturing of the surface. Such methods include, but are not limited to, hot-rollering, calendering, or plasma-etching. Media blasting with sand, grit or other abrasive media may also be used to texture the surface of the extruded thermoplastic. Such techniques are well-known in the art CMP art.

Although the present invention has been described in detail, those skilled in the art should understand that they can make various changes, substitutions and alterations herein without departing from the spirit and scope of the invention in its broadest form.

What is claimed is:

1. A polishing pad, comprising:
    an extruded thermoplastic material selected from the class of amorphous thermoplastics selected from the group consisting of:
    aliphatic polyketones,
    aromatic polyketones and
    aromatic polysulfones; and
    wherein the polishing pad is free of a gate vestige.

2. The polishing pad as recited in claim 1 wherein a thickness of said pad varies by less than 1%.

3. The polishing pad as recited in claim 1 wherein said polishing pad has a modulus ranging from about 1 MPascal to about 200 MPascal.

4. The polishing pad as recited in claim 1 wherein said polishing pad has an elongation-to-break of about 25%–1000%.

5. The polishing pad as recited in claim 1 wherein said polishing pad has an elongation-to-break of about 50%–500%.

6. The polishing pad as recited in claim 1 wherein said polishing pad has an elongation-to-break of about 100%–350%.

7. The polishing pad as recited in claim 1 wherein said polishing pad has an elongation-to-break of greater than 120%.

8. The polishing pad as recited in claim 1 wherein said thermoplastic has a critical surface tension greater than about 30 milliNewtons/meter.

* * * * *